Aug. 5, 1969     B. A. GERPHEIDE     3,459,879
FLEXIBLE MULTIFLAT CONDUCTOR CHARACTERISTIC IMPEDANCE CABLE
Filed May 29, 1967
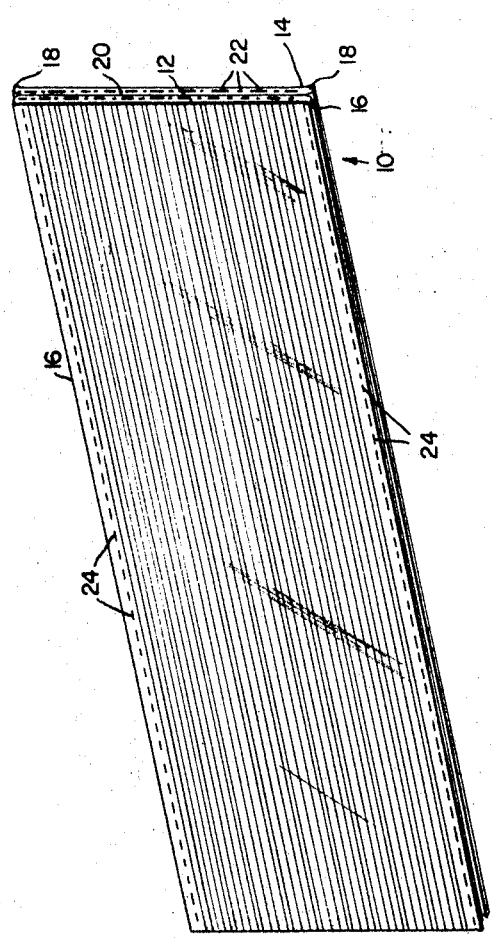
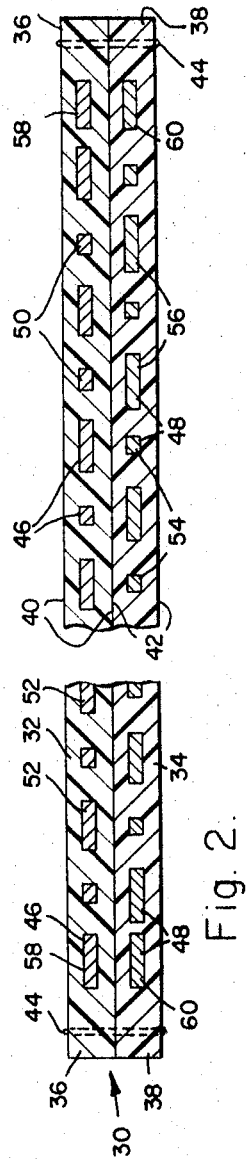
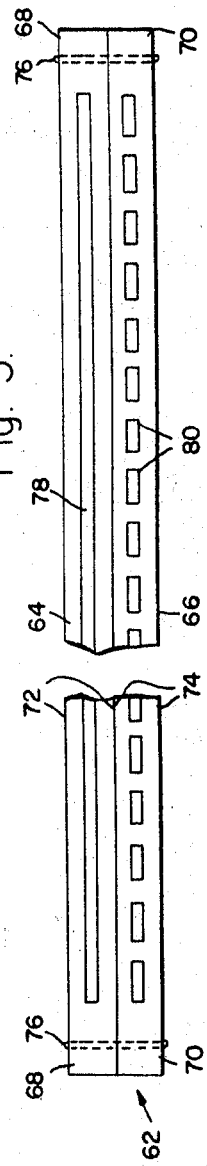
Burton A. Gerpheide,
INVENTOR.
BY
ATTORNEY.

`United States Patent Office`
3,459,879
Patented Aug. 5, 1969

3,459,879
FLEXIBLE MULTIFLAT CONDUCTOR CHARACTERISTIC IMPEDANCE CABLE
Burton A. Gerpheide, Pacific Palisades, Calif., assignor to Hughes Aircraft Company, Culver City, Calif., a corporation of Delaware
Filed May 29, 1967, Ser. No. 642,046
Int. Cl. H01b 7/04, 7/08
U.S. Cl. 174—117                7 Claims

ABSTRACT OF THE DISCLOSURE

A flexible cable assembly, having controlled and uniform electrical characteristics, comprises a pair of individual adjacent thin flat electrical cables which are flexibly affixed together only at their longitudinally extending edges. One of the cables comprises several signal and ground conductors which are alternately placed and precisely spaced from one another throughout the width of the cable. The other conductor may comprise several similar conductors or, alternatively, a single wide conductor. The width of the ground conductors is greater than the width of the signal conductors and the ground conductors of one cable overlap the signal conductors of the other cable.

---

The present invention relates to a flexible, electrical cable assembly formed from a pair of geometrically configured multiconductor cables which are geometrically arranged and flexibly secured together to obtain controlled electrical properties and to facilitate ease of termination and connecting to circuit components. In particular, the cable assembly is so constructed as to provide a characteristic impedance which is uniform tthroughout the length of the assembly.

It is well-known that a signal-carrying electrical conductor may be characterized by the parameters of resistance, capacitance, and inductance. These characterized parameters enable signals of varying frequency and magnitude to disturb other current-carrying conductors as well as components in surrounding devices. The signal-carrying conductor can in turn be disturbed by other conductors and neighboring components. In many applications, variations in values of inductance and capacitance deleteriously affect the system in which such a conductor is placed, and therefore, it is necessary to control the values of these characteristics. Consequently, many signal conductors are shielded by means of a peripheral ground conductor, such as in a coaxial cable, or by other means. Although such shielded cables are able to control the various electrical characteristics, they present several problems.

One vexatious problem arises in the fact that such cables are stiff and bulky which makes it difficult, if not impossible, to utilize them in compact installations and miniaturized circuits. With respect to miniaturized circuits, it is usually necessary to extend conductors over and around the several components which comprise the overall circuit. In such installations, it is ofttimes impossible to utilize well-known cables because their stiffness and bulkiness prevents bending of the cables. In addition, the control of the electrical disturbances between cables is difficult to achieve because of the compactness and close association between such cables and the components and other cables.

Single flat cables, which comprise a plurality of signal and ground conductors of several layers encased within a single dielectric, also present problems. They are relatively bulky and stiff and, consequently, resist bending and act as a beam. Furthermore, because such single flat cables contain one or more layers of conductors, it is difficult to remove the insulation from each conductor and to terminate each conductor without preventing electrical contact between stripped conductors. This condition has been avoided only by use of specially designed and expensive stripping machinery.

The present invention overcomes these and other problems by providing a flexible cable assembly having controlled and uniform electrical characteristics and an improved termination capability. Basically, the invention includes a cable assembly assembled from a pair of individual adjacent thin flat electrical cables which are flexibly affixed together only at their longitudinally extending edges. One of the cables comprises several signal conductors, and, if desired, ground electrical conductors which are alternately placed and precisely spaced from one another throughout the width of the cable. The other cable may comprise several similar conductors, or alternatively, a single wide conductor.

Where both cables comprise several signal and/or ground conductors, the conductors in each cable are so positioned as to provide a series of alternately positioned signal and ground conductors. The width of alternate conductors is different from the width of adjacent conductors so that each cable forms a non-symmetrical geometrical cross-sectional configuration beginning at one edge with two wide width conductors, one narrow width conductor, one wide width conductor, one narrow width conductor, and so forth, and terminating at the other edge with one wide width conductor. All the narrow width conductors preferably comprise a set having the same width while all the wide width conductors preferably comprise another set having the same width.

When both cables are placed together to provide a face-to-face arrangement, a wide conductor of one cable overlies a narrow width conductor of the other cable to provide another geometrical configuration. Because both cables are identical, it is possible to cut equal lengths of each cable from the same continuous strip, thus contributing to uniformly configured cables. The current or signals carried by one set of conductors may then be so interrelated as to effect a cable assembly having specific and controlled electrical characteristics, in particular, a characterized impedance which is uniform throughout the length of the cable assembly.

Several of the conductors, for example, the set of wide conductors, may operate as ground conductors to prevent external disturbances from affecting the signal or signals carried by the other set of conductors. In addition, the signals in one conductor will not affect the signals in other conductors.

In the embodiment where one of the cables includes a single wide conductor, the wide conductor overlaps the several signal conductors carried in the other cable in order to obtain a similar control of the electrical characteristics.

In both cases, alignment means are provided at the longitudinally extending edges of the cables so that the assembly of the cables into the geometrically configured cable assembly may be facilitated. In the embodiment where both cables include a plurality of conductors, both cables include conductors of the same width at their edges so that the edge conductors of one cable may be aligned with the corresponding edge conductors of the other cable.

Because the cable assembly is formed from a pair of individual cables, termination is facilitated since each cable may be separately stripped, thereby eliminating the need for special machinery.

It is, therefore, an object of the present invention to provide an improved electrical conductor cable assembly.

Another object is the provision of a multiconductor shielded cable assembly.

Another object is to provide a flexible multiconductor cable assembly.

Another object is the provision of an electrical conductor cable assembly having a high conductor density characteristic impedance to enable high circuit densities.

Another object is to provide an easily terminated cable assembly.

Other aims and objects, as well as a more complete understanding of the present invention, will appear from the following explanation of exemplary embodiments and the accompanying drawings thereof, in which:

FIG. 1 is an elevational view of the cable assembly;

FIG. 2 is a cross-sectional view of a first embodiment of the cable assembly; and FIG. 3 is a cross-sectional view of a second embodiment of the invention.

Referring to FIG. 1, a cable assembly 10 comprises a first cable 12 and a second cable 14. Each cable comprises conductors encased in an insulating material. Cable 12 terminates its cross-section with a pair of longitudinally extending edges 16 while cable 14 cross-sectionally terminates in a pair of longitudinally extending edges 18. Both cables have widths between their respective edges 16 and 18 which are greater than their thicknesses to produce at least one pair of faces. When assembled, the faces contact as shown by indicium 20. At least one of the cables is provided with a plurality of conductors 22 and, depending upon the particular embodiment shown in FIG. 2 and FIG. 3, the other cable includes either a plurality of similar conductors or a single conductor. To enhance flexibility, the conductors in each cable preferably are flat and are coplanar. Because all of the conductors of each cable are flat and in the same plane across the width of each cable, the conductors may be designed to match land areas on etched circuit boards. The spacing between the conductors may be uniform or not depending upon the design of the connection points on the circuit boards. However, assembly of the cables into the cable assembly may be facilitated by use of uniform spacing.

Cables 12 and 14 are joined at their respective edges 16 and 18 by a series of bonds 24. Each one of the bonds has a discrete spacing from an adjacent one of the bonds. Preferably, the bonds comprise stitching; however, any form of suitable bonding means may be employed, such as melting of the insulating materials of the cables. Regardless of the particular bonding means, the cables are joined in such a manner that a small amount of slippage is available between the cables in a longitudinal fashion. In addition, the conductors in both cables are so proportioned as to provide an allowance for any small transverse movement between the cables and for inaccuracies in assembling the cables.

Referring now to FIG. 2, a cable assembly 30 comprises a first cable 32 and a second cable 34. Cable 32 includes a pair of longitudinally extending edges 36, while cable 34 is provided with longitudinally extending edges 38. As shown, both cables have widths which are relatively larger than their thicknesses to provide respective faces 40 and 42. One of the faces 40 and 42 of each cable are in contact throughout the width and length of the two cables and the edges 36 and 38 are aligned to provide a face-to-face and edge-to-edge arrangement between the cables. Bonds 44 are secured to the cables at the edges thereof to affix the cables together into a unitary cable assembly. As set forth above, bonds 44 may comprise stitching by any suitable material, such as nylon. If desired, however, the bonds may be formed by means of a heat wheel having small slots therein to provide a series of spaced fusions between the insulating material of the cables. Alternatively, some form of binding may be used. Regardless of the particular attachment means, the bonds are so provided as to permit a small amount of longitudinal movement between the cable when the cable assembly is bent along a transverse plane so that the small movement of each bond is additive to provide the cable assembly with a cumulative compliance.

Cable 32 is provided with a plurality of conductor strips 46 encased within a dielectric and cable 34, in a similar manner, is provided with conductor strips 48 encased within a dielectric. Conductor strips 46 are segregated into two sets 50 and 52. Each strip of set 50 is provided with a width having a dimension which is less than each strip of set 52. In addition, the strips of set 50 and 52 alternate so that the disposition thereof alternates in spaced wide and narrow strips. In a similar manner, strips 48 of cable 34 comprise a set 54 of strips having a width whose dimension is less than another set 56 and sets 54 and 56 are alternately spaced such that wide and narrow strips are alternately positioned throughout the width of cable 34.

Adjacent their edges both cables are provided with strips 58 and 60 which have the same width in order to provide a means for aligning the cables during assemblage thereof. The alternating sets of strips in the respective cables are further so arranged that, when the cables are secured together, the wider strips of one cable are positioned across from the narrow strips of the other cable. Thus, sets 52 and 56 of the wide strips respectively overlap sets 54 and 50 of the narrow strips and provide an allowance or tolerance for assembly inaccuracies during manufacture and for small slippage between the cables in a transverse direction during use. If wider sets 52 and 56 are adapted as ground leads, for example, they will enhance isolation of the signals being conducted in each of the narrow sets.

A second embodiment of the invention, depicted in FIG. 3, comprises a cable assembly 62 formed from a pair of conduits 64 and 66. The cables are provided with longitudinally extending edges 68 and 70 and the width of each cable is greater than the thickness thereof to provide faces 72 and 74. Both cables have substantially equal widths and bonding means 76, similar to that described above, is secured adjacent to the edges of the cables to maintain a face-to-face and edge-to-edge arrangement of the cables. Cable 64 includes a single conductor 78 while cable 66 is provided with a plurality of conductors 80 which are spaced throughout the transverse width of cable 66. Preferably, the spacing is uniform to facilitate assembly of the cables into the cable assembly. As shown, conductors 80 have widths of equal dimensions; however, if desired, the widths of conductors 80 may vary, such as depicted in the FIG. 2 embodiment. Preferably, the width between the extreme conductors 80 is at least as great as the width of conductor 78 in order to make allowance for manufacturing inaccuracies and slippage between the cables.

In the specific embodiments illustrated, the spacing between the conductors and the geometric configurations of the cables, as well as the specific material and thickness of the insulation or dielectric materials, provides for a specific set of parameters in terms of inductance, capacitance and resistance. These parameters define an impedance which, when taken into consideration with the geometry of the cable assembly, defines a unique and characteristic impedance which is uniform throughout the length of the cable assembly. Thus, the characteristic impedance also is not affected by the length of the cable assembly and permits a high circuit density.

Although the invention has been described with reference to particular embodiments thereof, it should be realized that various changes and modifications may be made therein without departing from the spirit and scope of the invention.

What is claimed is:
1. A flexible electrical cable assembly comprising:
   a first flat and thin electrical cable having a wide and thin transverse cross-section to form a large face bounded by longitudinally extending edges, a second flat and thin electrical cable having a wide and thin transverse cross-section to form a large face bounded by longitudinally extending edges, said first and second cables having a face-to-face and edge-to-edge arrangement including slidable contact of said large faces, and attachment means secured to said first and second cables at the edges thereof to flexibly secure said cables together in the slidable contact.

2. A cable assembly as in clam 1 wherein said attachment means comprises stitching.

3. A cable assembly as in claim 1 wherein said attachment means comprises a series of bonds between the edges of said first and second cables, each one of said bonds having a spacing from an adjacent one of said bonds.

4. A flexible electrical cable assembly comprising:
a first flat and thin electrical cable
comprising an electrical conductor encased within a dielectric, said conductor having a width approximately the width of said first cable, and having a wide and thin transverse cross-section to form a large face bounded by longitudinally extending edges;
a second flat and thin electrical cable
comprising a series of transversely spaced, longitudinally extending electrical conductors, and having a wide and thin transverse cross-section to form a large face bounded by longitudinally extending edges;
said first and second cables having a face-to-face and edge-to-edge arrangement such that said first cable conductor overlaps said second cable series of conductors; and
attachment means secured to said first and second cables at the edges thereof to flexibly secure said cables together.

5. A flexible electrical cable assembly comprising:
a first flat and thin electric cable having a wide and thin transverse cross-section to form a large face bounded by longitudinally extending edges and comprising a series of transversely spaced, longitudinally extending, flat electrical conductors
a first set of sair conductors having a first width and
a second set of said conductors having a second width of dimension less than that of the first width, a second flat and thin electrical cable having a wide and thin transverse cross-section to form a large face bounded by longtiudinally extending edges and comprising a series of transversely spaced, longitudinally extending, flat electrical conductors,
a first set of said conductors having a first width and
a second set of said conductors having a second width of dimension less than that of the first width,
said first and second cables having a face-to-face and edge-to-edge arrangement, said arrangement between said cables providing an overlapping of said first set of said first cable conductors on said second set of said second cable conductors and an overlapping of said first set of said second cable conductors on said second set of said first cable conductors, and
attachement means secured to said first and second cables at the edges thereof to flexibly secure said cables together.

6. A cable assembly as in claim 5 wherein said first set and said second set of both said first and second cable conductors are alternately placed in each said cable such that each one of said conductors of said first set is positioned adjacent to each one of said conductors of said second set.

7. A cable assembly as in claim 6 further including longitudinally extending flat electrical conductors at the edges of said first and second cables, each of said edge conductors having a width coersponding to the first width to provide alignment of said cables.

References Cited

UNITED STATES PATENTS

| | | | |
|---|---|---|---|
| 269,869 | 1/1853 | Mackintosh | 174—117 X |
| 280,518 | 7/1853 | Rogers. | |
| 681,470 | 8/1901 | Wolff | 174—117 |
| 3,173,991 | 3/1965 | Breakfield. | |
| 3,179,904 | 4/1965 | Paulsen | 174—117 X |

E. A. GOLDBERG, Primary Examiner

U.S. Cl. X.R.

333—1